United States Patent
Saha et al.

(10) Patent No.: US 11,768,758 B2
(45) Date of Patent: Sep. 26, 2023

(54) PATH-COVERAGE DIRECTED BLACK BOX API TESTING

(71) Applicant: International Business Machines Corporation, Armonk, NY (US)

(72) Inventors: Diptikalyan Saha, Bangalore (IN); Devika Sondhi, Gurgaon (IN); Eitan Daniel Farchi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 17/495,200

(22) Filed: Oct. 6, 2021

(65) Prior Publication Data
US 2023/0106929 A1    Apr. 6, 2023

(51) Int. Cl.
G06F 11/36  (2006.01)
G06N 20/00  (2019.01)
G06N 5/01   (2023.01)

(52) U.S. Cl.
CPC ...... *G06F 11/3676* (2013.01); *G06F 11/3688* (2013.01); *G06N 5/01* (2023.01); *G06N 20/00* (2019.01)

(58) Field of Classification Search
None
See application file for complete search history.

(56) References Cited

U.S. PATENT DOCUMENTS

| 11,474,936 | B2* | 10/2022 | Khillar | G06F 9/541 |
| 2014/0075242 | A1* | 3/2014 | Dolinina | G06F 11/3672 714/E11.178 |
| 2016/0253185 | A1* | 9/2016 | Goldstein | G06F 8/75 719/328 |
| 2018/0196731 | A1* | 7/2018 | Moorthi | G06F 8/71 |
| 2020/0073788 | A1* | 3/2020 | Saha | G06F 11/3688 |

OTHER PUBLICATIONS

Castro, Laura M., and Miguel A. Francisco. "A language-independent approach to black-box testing using Erlang as test specification language" Journal of Systems and Software 86 12: Jul. 18, 2013, pp. 3109-3122.

(Continued)

*Primary Examiner* — Isaac Tuku Tecklu
(74) *Attorney, Agent, or Firm* — Ryan, Mason & Lewis, LLP

(57) ABSTRACT

Methods, systems, and computer program products for path-coverage directed black box application programming interface (API) testing are provided herein. A computer-implemented method includes determining constraints based on inputs and corresponding outputs of an API in a production environment; generating initial test inputs based at least in part on the constraints; creating a program dependency graph based on trace sequences and request-response data obtained in response to providing the initial test inputs to an endpoint of the API; enhancing the program dependency graph by generating additional test inputs directed to one or more paths of the dependency graph; identifying, based on the enhanced program dependency graph, at least a portion of the API that is not covered by an existing test suite; and using the enhanced program dependency graph to generate new test cases for the test suite based on the identifying.

20 Claims, 12 Drawing Sheets

(56) References Cited

OTHER PUBLICATIONS

Martin-Lopez, Alberto, Sergio Segura, and Antonio Ruiz-Cortés. "RESTest: Automated Black-Box Testing of RESTful Web APIs." (2021).
Miller, James, Marek Reformat, and Howard Zhang. "Automatic test data generation using genetic algorithm and program dependence graphs." Information and Software Technology 48.7, Jul. 1, 2006, pp. 586-605.
Viglianisi, Emanuele, Michael Dallago, and Mariano Ceccato. "RestTestGen: Automated Black-Box Testing of RESTful APIs." 2020 IEEE 13th International Conference on Software Testing, Validation and Verification (ICST). IEEE, 2020.
Sen, Koushik. "DART: Directed Automated Random Testing." Haifa Verification Conference. vol. 6405. 2009.
Cadar, Cristian, et al. "EXE: Automatically generating inputs of death." ACM Transactions on Information and System Security (TISSEC) 12.2 (2008): 1-38.
Sen, Koushik, Darko Marinov, and Gul Agha. "CUTE: A concolic unit testing engine for C." ACM SIGSOFT Software Engineering Notes 30.5 (2005): 263-272.
Atlidakis, Vaggelis, Patrice Godefroid, and Marina Polishchuk. "Restler: Stateful rest api fuzzing." 2019 IEEE/ACM 41st International Conference on Software Engineering (ICSE) IEEE, 2019.
Singh, Rishabh. "Blinkfill: Semi-supervised programming by example for syntactic string transformations." Proceedings of the VLDB Endowment 9.10 (2016): 816-827.
Mell, Peter, et al., The NIST Definition of Cloud Computing, National Institute of Standards and Technology, U.S. Department of Commerce, NIST Special Publication 800-145, Sep. 2011.

* cited by examiner

```
{
  "data": [
    {
      "traceID": "0afae8df80a12345",
      "spans": [
        {
          "traceID": "0afae8df80a12345",
          "spanID": "49116f9de9a23456",
          "operationName": "GET /MyApi/A1",
          "references": [
            {
              "refType": "CHILD_OF",
              "traceID": "0afae8df80a12345",
              "spanID": "551f436f4234567"
            }
          ],
          "startTime": 1612169292011299,
          "duration": 258566,
          "tags": [...],
          "processID": "p1"
        },
        {
          "traceID": "0afae8df80a12345",
          "spanID": "31f950da4d445678",
          "operationName": "GET /MyApi/A2",
          "references": [
            {
              "refType": "CHILD_OF",
              "traceID": "0afae8df80a12345",
              "spanID": "49116f9de9a23456"
            }
          ],
          "startTime": 1612169292166597,
          "duration": 336659,
          "tags": [...],
          "processID": "p2"
        }, ...
```

```
"1":{
  "request":{
    "Request Url":"http://localhost:8080/MyApi/A1?X=-12.3&Y=456.78"
  },
  "response":{
    "statusType":"OK",
    "entity":348.60035888212345,
    "entityType":"java.lang.Double",
    "status":200
  }
},
"2":{
  "request":{
    "Request Url":"http://localhost:8080/MyApi/A1?X=-98.76&Y=-543.21"
  },
  "response":{
    "statusType":"BAD_REQUEST",
    "entity":null,
    "entityType":null,
    "status":400,
  }
},
...
```

600

FIG. 6

PATH-COVERAGE DIRECTED BLACK BOX API TESTING

BACKGROUND

The present application generally relates to information technology and, more particularly, to application programming interface (API) testing.

An API refers to software code that allows software applications or services to communicate with each other. API testing is performed to validate the API is meeting expectations in terms of functionality, reliability, performance, and security, for example. Techniques for API testing generally include generating requests to at least one endpoint of the API and validating the corresponding response.

SUMMARY

In one embodiment of the present disclosure, techniques for path-coverage directed black box API testing are provided. An exemplary computer-implemented method includes the steps of determining one or more constraints based on one or more inputs and one or more corresponding outputs of an application programming interface in a production environment; generating one or more initial test inputs based at least in part on the one or more constraints; creating a program dependency graph based on trace sequences and request-response data obtained in response to providing the one or more initial test inputs to at least one endpoint of the application programming interface; enhancing the program dependency graph by generating one or more additional test inputs directed to at least one of a plurality of paths of the dependency graph; identifying, based on the enhanced program dependency graph, at least a portion of the application programming interface that is not covered by an existing test suite; and using the enhanced program dependency graph to generate one or more new test cases for the test suite based on the identifying.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 5 shows an example of a trace sequence for an API in accordance with exemplary embodiments;

FIG. 6 shows an example of request-response data for an API in accordance with exemplary embodiments;

DETAILED DESCRIPTION

Figure 1:
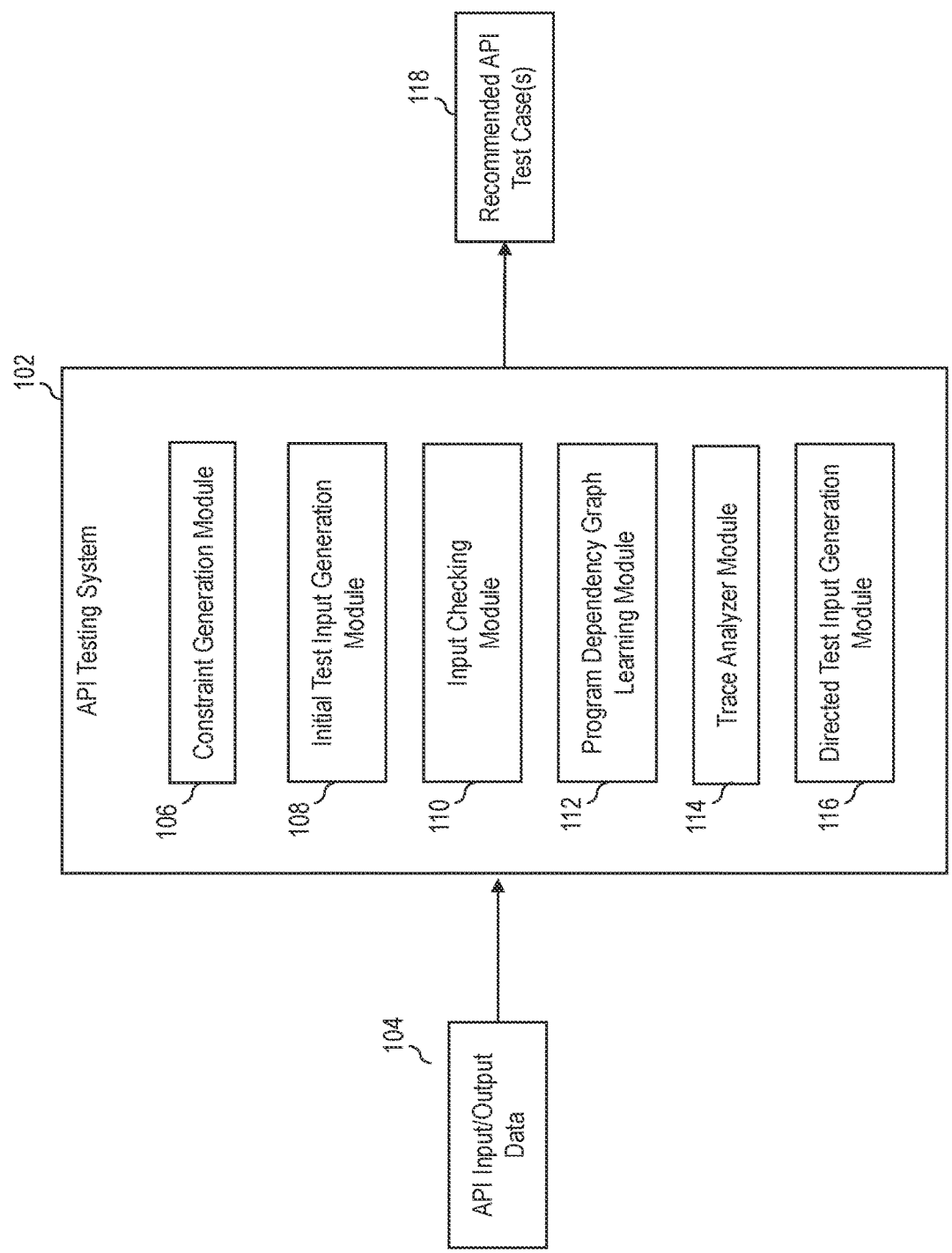
FIG. 1 is a diagram illustrating a system architecture in accordance with exemplary embodiments.

Generally, an existing testing setup includes a production environment and a test environment. A test environment is beneficial as runtime information can be gathered different in a test environment than a production environment. For example, assume that an API in a production environment is causing errors, and so more automatically generated test cases are needed in test environment. In the production environment, information may be gathered as request, response data from multiple production runs of an API. In a test environment, request, response data can be gathered for a top-level API. Optionally, the test environment can be configured to gather at least one of: request, response data for the all-level API and trace data indicating a sequence of internal API calls, for example.

API testing generally considers the API a black box, where only requests and responses are observed, as opposed to the underlying functionality. Additionally, APIs can be represented in a standardized format (e.g., as a Swagger document or as an OpenAPI specification, for example). Such formats can enable developers to design a technology-agnostic API interface that forms the basis of their API development and consumption, for example.

API testing is often inefficient and time consuming as developers often need to manually write test cases. Although some existing techniques automatically generate API test cases, such techniques suffer from one or more of the following disadvantages: require access to source code, provide limited coverage, and are limited on the number of test samples.

Exemplary techniques described herein address one or more of the issues described above by, for example, inferring a behavioral model of a black-box API to systematically generate test cases. One example embodiment includes learning a program dependency graph (PDG) of each API endpoint using input-output data from randomly generated and/or synthetically generated test cases. The PDG may approximately capture, for example, data dependency (e.g., function computed in the API), and control dependency (e.g., branching behavior of the program). The PDG, in some embodiments, is used for static analysis to identify buggy behaviors. The static analysis may be a language independent static analysis. Additionally, the PDG may be used for understanding the API logic and systematically exploring a search space to provide better testing coverage and reveal deeper bugs, for example. As an example, paths of the PDG may be explored by generating inputs that are similar to inputs that resulted in failures. Trace information can be gathered and used to explore the boundaries of paths corresponding to positive and negative traces. In this context and elsewhere herein, a positive trace refers to a trace of an input that resulted in a response that follows a specification of the API; otherwise, the trace is considered a negative trace. In at least one embodiment, test cases can be recommended for portions of the API that are not tested by an existing test suite. The coverage of the existing test suite may be measured by the PDG, for example.

Referring now to FIG. 1, this figure illustrates a system architecture in accordance with exemplary embodiments. The system architecture includes an API testing system 102 which obtains API input/output data 104 and generates one or more recommended API test cases 118. The API testing system 102 includes: a constraint generation module 106, an initial test input generation module 108, an input checking module 110, a program dependency graph learning module 112, a trace analyzer module 114, and a directed test input generation module 116.

The constraint generation module 106 generates constraints based on the API input/output data 104. By way of example, the constraint generation module 106 may be deployed in a production environment and the API input/output data 104 may correspond to request-response data of a top-level API in the production environment. The API input/output data 104 may be obtained via a gateway (not explicitly shown in FIG. 1) of the API in the production environment. The constraint generation module 106 may generate the constraints using production traces of the API input/output data 104. Generally, the constraints capture the distribution of the API input/output data 104 and the relationships between various inputs. For example, if a marital status input may constrain an age input, such that a marital status of "married" is only seen above a certain age threshold, for example. As such, the constraints from production API input/output data 104 capture the realistic input distribution.

In one embodiment, the initial test input generation module 108 generates random input and synthetic test inputs. For example, the random test inputs may include a sequence of API calls with random data, and the synthetic inputs may include using one or more data synthesis techniques to generate data based on the constraints.

The input checking module 110 checks whether the generated inputs are compatible with a specification of the API (e.g., a Swagger document or an OpenAPI specification). The input checking module 110, in some embodiments, determines whether traces corresponding to at least one of the generated inputs is a positive or negative trace based on whether it conforms to the specification. The input checking module 110 may make this determination at least in part on output of a parser that parses the specification of the API.

The program dependency graph learning module 112 learns a PDG using, for example, at least one regression learning technique.

The trace analyzer module 114 determines whether a given trace failed or passed using a set of rules in a test oracle (or database). Also, in at least one embodiment, the trace analyzer module 114 may obtain feedback from a user to make one or more updates to the test oracle.

The directed test input generation module 116 generates test inputs to explore un-explored paths in the PDG in a controlled manner. For example, the directed test input generation module 116 may: generate test inputs to tighten bounds in the PDG, generate test inputs to update the test oracle or relax test oracle bounds; and/or perform failure directed test case generation, as explained in more detail herein. The directed test input generation module 116, for example, may determine coverage of the test oracle, identify varied decision paths in the PDG, and then generate new inputs using symbolic execution. The new inputs may be output in the form of one or more recommended API test cases 118. The recommended API test cases 118 may be output to a user or automatically integrated into a test suite, for example.

In at least some embodiments, a PDG is generated to capture control dependency and data dependency between inputs and outputs. In this manner, the PDG effectively imitates non-concurrent, deterministic program behavior with linear operations, which includes most non-scientific and non-AI applications, for example. The PDG may be learned by modeling API request-response data (corresponding to API input/output data 104, for example). The information modeling may include, for example, determining if 'intermediate' data gathering is enabled. If so, then the input variables include all data that is coming into the program (e.g., request and intermediate API response), and the output variables include all data going out of the program (e.g., response and intermediate API requests). If not, then the modeling may include identifying dependent structures, such as customer and customer identifier (cid), book and book identifier (bid); or order, customers, cid, book, and bid, where customer and book are assumed to be input. A data structure model is then generated by transforming such data into scalars using JSON nested paths or by approximating recursive structures. The PDG may be in the form of a multi-output decision tree regressor model, where strings are separately handles using program synthesis.

In at least one embodiment, the data-structures may be modeled by flattening attributes, nested in a JSON object, into scalar entities, and the recursive structures can be approximated up to a certain bound. By way of example, consider JSON customer object that is represented as follows:

{'customer': {'name':{'firstname': string, 'secondname': string}, 'id': string}}.

The customer object above includes a nested object (i.e., "name"), which, in some embodiments, is flattened to "customer.name.firstname, customer.name.secondname, customer.id." In an example that includes recursive nesting (e.g., a customer object includes a reference to another customer object inside the JSON body), the process is restricted to a configurable bound.

Path exploration of the PDG is performed, in some embodiments, by exploring paths corresponding to positive traces, such as by using at least one of: random fuzzing, combinatorial exploration techniques, and constraint-driven techniques. A constraint-driven technique may include, for example, performing the following for each decision tree path in the PDG: taking the conditions from the root node to the leaf node, generating an input space and conjunction of conditionals, and using a constraint solver to generate input solving the expression.

In one or more embodiments, if a PDG is represented as a decision tree is, the union of branch conditions along the path from the root to the leaf node can form a single constraint. For instance, given inputs x and y, an example of a constraint along a path may be: (x<10 & x>3 & y>3). Each such constraint can be passed to a constraint solver to generate at least one input satisfying the constraint, which can be used as a test case. For the example constraint above, the constraint solver can check if values exist for x and y that satisfy the constraint predicate (x<10 & x>3 & y>3). Concrete values may then be returned for x and y (e.g., say x=5 and y=8).

It is to be appreciated that a constraint solver is an automated system, based on the foundations of constraint programming, ad can be used to check the satisfiability of a constraint and produce a concrete input that satisfies the constraint.

Figure 2:
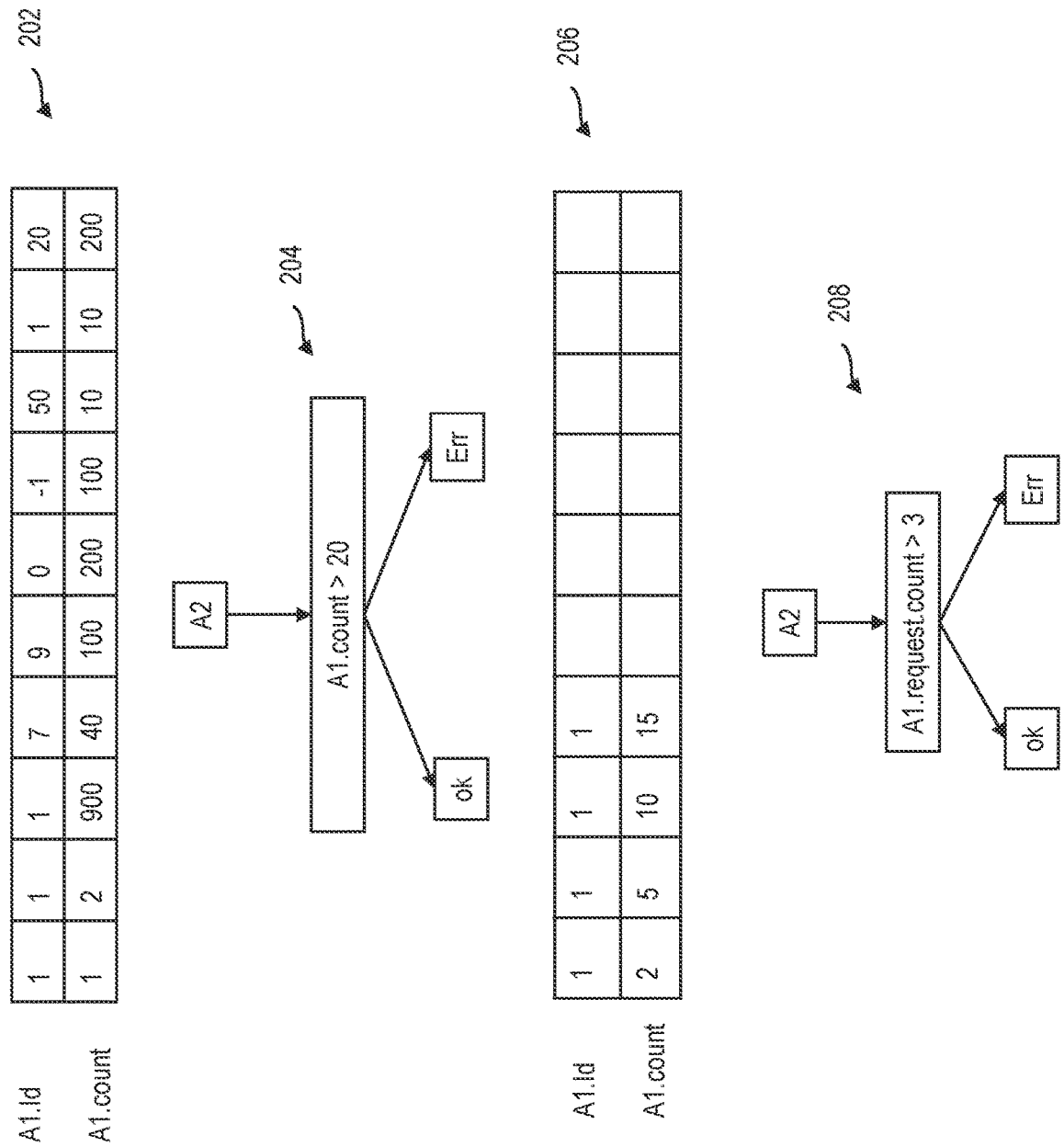
FIG. 2 is a diagram illustrating techniques for generating inputs to explore paths of a program dependency graph in accordance with exemplary embodiments.

Referring now to FIG. 2, this figure is a diagram illustrating techniques for generating inputs to explore paths of a PDG in accordance with exemplary embodiments. More specifically, FIG. 2 shows a first table of inputs 202 that was generated to explore inputs between positive and negative paths of the decision tree 204. The decision tree 204 may correspond to a portion of a PDG that represents an API. Specifically, the table 202 include inputs for A1.id and A1.count. In this example, the decision tree 204 returns an "ok" response when the input values are 1, 2, and 10 for A1.count; and otherwise returns an error response (i.e., "Err").

FIG. 2 shows another example table of inputs 206 for the count and id variables. In this example, the inputs in the table 206 are intended to explore paths between positive and negative paths of the decision tree 208. It is assumed that the decision tree 208 is intended to capture the block box API having the following source code:

```
A1(int id, int count){
    if(count > 3){
        return error
    }else{
        return ok
    }
}
```

Figure 3:
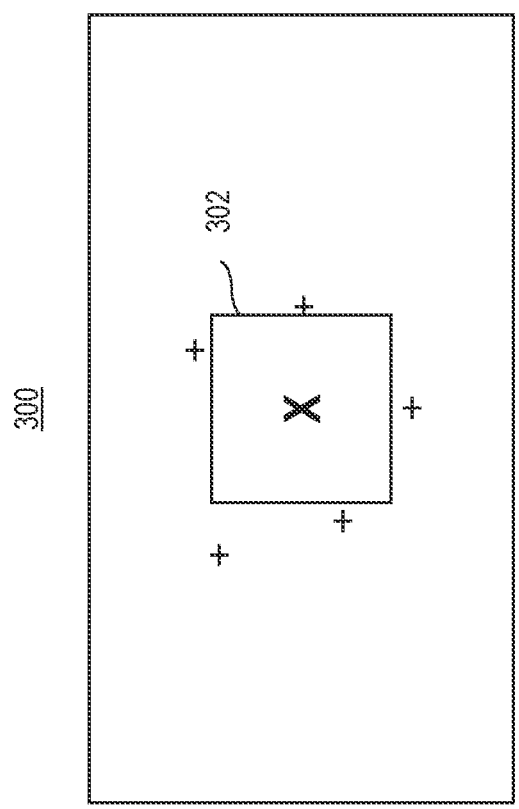
FIG. 3 is a diagram illustrating further techniques for generating inputs to explore paths of a program dependency graph in accordance with exemplary embodiments.

FIG. 3 is a diagram illustrating further techniques for generating inputs to explore paths of a PDG in accordance with exemplary embodiments. More specifically, FIG. 3 represents an input space 300, where the 'X' represents an input of a trace of an API that resulted in a failure. As such, in at least some embodiments, multiple additional test inputs (each represented by a "+") are created to further define and narrow a failure space 302 within the input space 300. Thus, when a failure trace is observed, the range of inputs may be perturbed to find the input condition based on which the failure behavior is seen.

Figure 4:
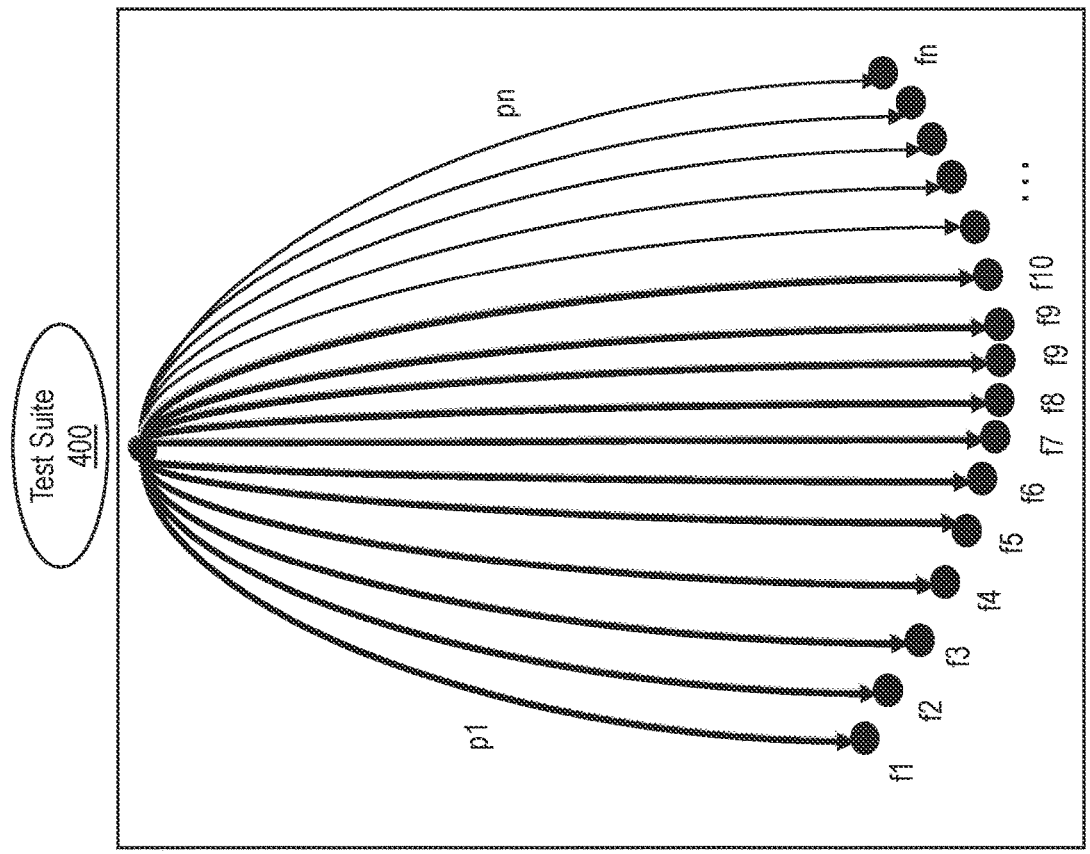
FIG. 4 is a diagram illustrating techniques for identifying untested portions of an API in accordance with exemplary embodiments.

FIG. 4 is a diagram illustrating techniques for identifying untested portions of an API in accordance with exemplary embodiments. In this example, a plurality of paths p1 ... pn are assumed to correspond to a PDG that was generated for a given endpoint of an API. An existing test suite 400 is mapped onto the paths of the PDG to determine the current coverage of the test suite 400. The mapping may be automated by, for example, determining the path constraint in the PDG that is satisfied by an existing test case in the existing test suite 400, if any such path exists. In the FIG. 4 example, the test suite 400 in this example covers the paths corresponding to the bolded arrows to the endpoints of the paths (i.e., f1 ... f10). The process depicted in FIG. 4 may also include retrieving the untested paths, and generating a limited number of varied untested paths, as indicated by the arrows between the test suite 400 and the endpoints after f10 through fn. Accordingly, test cases can be recommended that increase the coverage. Also, in at least one embodiment, the number of test cases can be limited to a particular number in order to improve user experience. For example, the number of test cases can be limited to a default value, a value of user configurable parameter, or to the number of test cases that cover only the untested paths (as obtained from the PDG).

FIG. 5 shows an example of a portion of a trace sequence for an API in accordance with exemplary embodiments. Specifically, the portion of the trace sequence data 500 in FIG. 5 is assumed to be for testing the following API (which is treated as a black box):

```
A1(X, Y):
    if(Y>100 and X<45)
        z=A2(X)
    elseif(Y<=100 and X>=4)
        if(Y<96)
            z=A3(Y, X)
        else
            z=A3(X, Y)
    elseif(Y<11)
        z=A4(X, Y)
    return z
```

FIG. 6 shows an example of a portion of request-response data 600, in accordance with exemplary embodiments. More specifically, the request-response data 600 is associated with the API described above in conjunction with FIG. 5.

Figure 7:
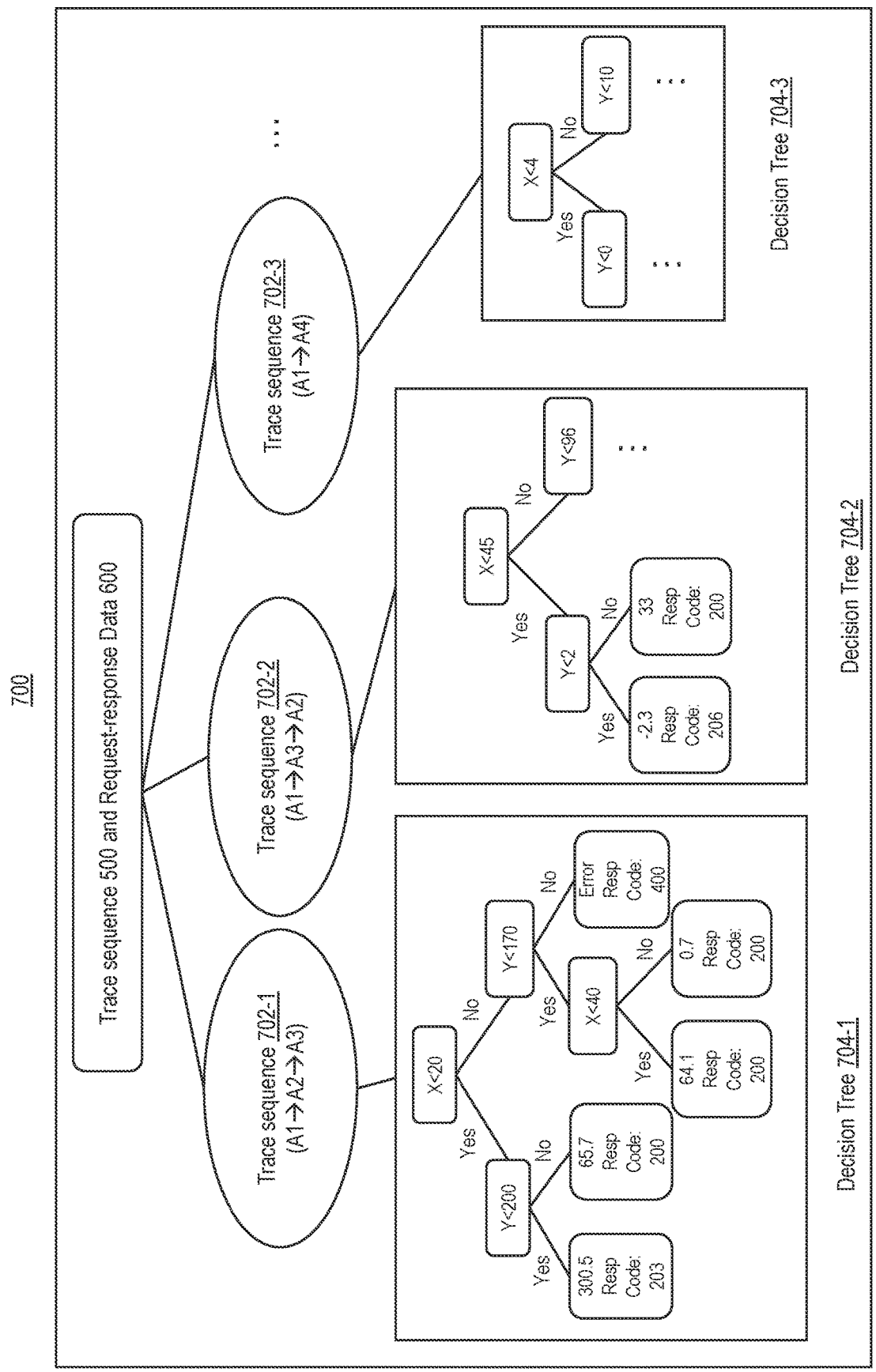
FIG. 7 shows an example of a program dependency graph in accordance with exemplary embodiments.

FIG. 7 shows an example of a PDG 700 in accordance with exemplary embodiments. It is assumed the PDG 700 is generated based on the trace sequence data 500 and the request-response data 600. The PDG 700 in FIG. 7 represents a portion of trace sequences 702-1, 702-2, and 702-3 corresponding to the trace data 500, and corresponding decision trees 704-1, 704-2, and 704-3. As such, the PDG 700 in FIG. 7 segregates and models the control and data dependencies of the API. More particularly, the trace sequences 702-1, 702-2, and 702-3 represent the traces: A1→A2→A3; A1→A3→A2; and A1→A4, respectively.

Figure 8:
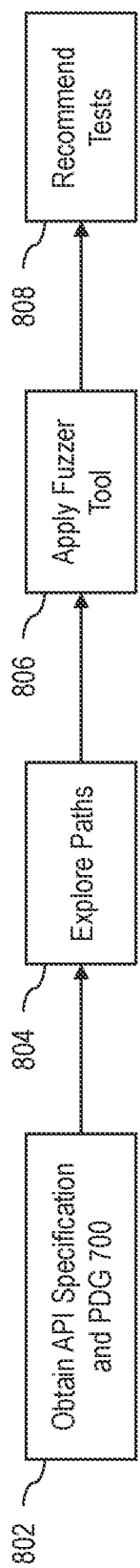
FIG. 8 is a diagram illustrating techniques for generating API tests in accordance with exemplary embodiments.

FIG. 8 shows an example of a process flow for generating recommended API tests in accordance with exemplary embodiments. In the FIG. 8 example, step 802 includes obtaining an API specification and the PDG 700 for the API. Step 804 includes exploring paths of the PDG to capture positive and negative path constraints (e.g., the constrains in PDG 700 may include the following: [{x<45, y<2, (A1→A2→A3)}, {x>=4, y<10, (A1→A3)}, ... ]). Step 806 includes applying a fuzzer tool. The fuzzer tool may, for example, generate inputs that explore the paths based on the constraints, generate random test inputs, or generate inputs using a failure directed path approach, as described in more detail elsewhere herein. Step 808 recommends tests based on the inputs generated at step 806.

Accordingly, one or more of the embodiments described herein, include generating realistic production payload data in privacy-preserving way to recommend untested system behavior for black-box API access. Additionally, in some embodiments, the system can generate explanations of failure producing inputs by correlating with feature space, and perform language-independent static analysis of black-box API. Also, a black-box API can be modeled to capture control and data flow dependency within a PDG. Rule-based static analysis can then on the PDG, and the PDG can be used to map existing test cases to identify untested behaviors and recommend tests from such untested behaviors. The PDG can be appropriately tagged with positive and negative behavior, and a search space can be explored to obtain and narrow down the failure input space.

Figure 9:
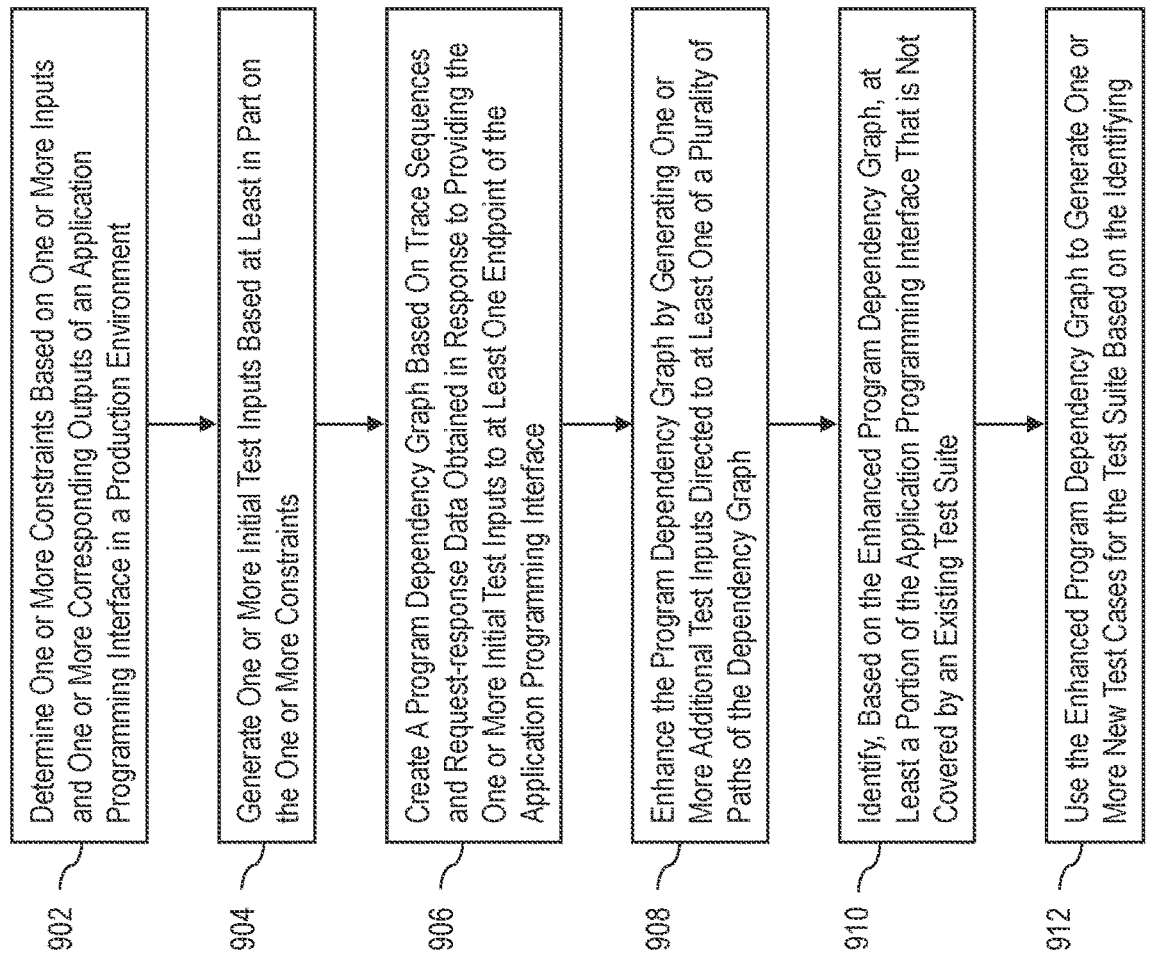
FIG. 9 is a flow diagram illustrating techniques for path-coverage directed black box API testing in accordance with exemplary embodiments.

FIG. 9 is a flow diagram illustrating techniques in accordance with exemplary embodiments. Step 902 includes determining one or more constraints based on one or more inputs and one or more corresponding outputs of an application programming interface in a production environment. Step 904 includes generating one or more initial test inputs based at least in part on the one or more constraints. Step 906 includes creating a program dependency graph based on trace sequences and request-response data obtained in response to providing the one or more initial test inputs to at least one endpoint of the application programming interface. Step 908 includes enhancing the program dependency graph by generating one or more additional test inputs directed to at least one of a plurality of paths of the dependency graph. Step 910 includes identifying, based on the enhanced program dependency graph, at least a portion of the application programming interface that is not covered by an existing test suite. Step 912 includes using the enhanced program dependency graph to generate one or more new test cases for the test suite based on the identifying.

The one or more initial test inputs and the one or more additional test input may satisfy a specification of the application programming interface. The specification of the application programming interface may be provided in a standardized, machine-readable format (such as an OpenAPI specification format). The process may include the steps of: assigning a first label to at least a first subset of the plurality of paths in the program dependency graph in response to determining that the request-response data corresponding to the path satisfies the specification of the application; and assigning a second label to a second subset of the plurality of paths in the program dependency graph in response to determining that the request-response data corresponding to the path fails to satisfy the specification of the application. The one or more additional test inputs may be generated to at least one of: determine boundaries of at least one of the paths in the first subset; and identify additional paths between paths in the first subset and paths in the second subset. At least one of the initial test inputs may result in a failure of the application programming interface, and the generating the one or more additional test inputs may include perturbing the at least one of the initial test inputs to identify conditions that cause the failure. The program dependency graph may represent at least one of: one or more data dependencies and one or more control dependencies corresponding to the application programming interface. Creating the program dependency graph may include: modeling the trace sequences and request-response data using at least one regression learning technique; and generating at least one decision tree for each of the trace sequences based on said modeling. The one or more initial test inputs may include at least one of: one or more synthetic inputs and one or more random inputs. The identifying may include mapping test cases in the existing test to the plurality of paths of the program dependency graph.

The techniques depicted in FIG. 9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 10:
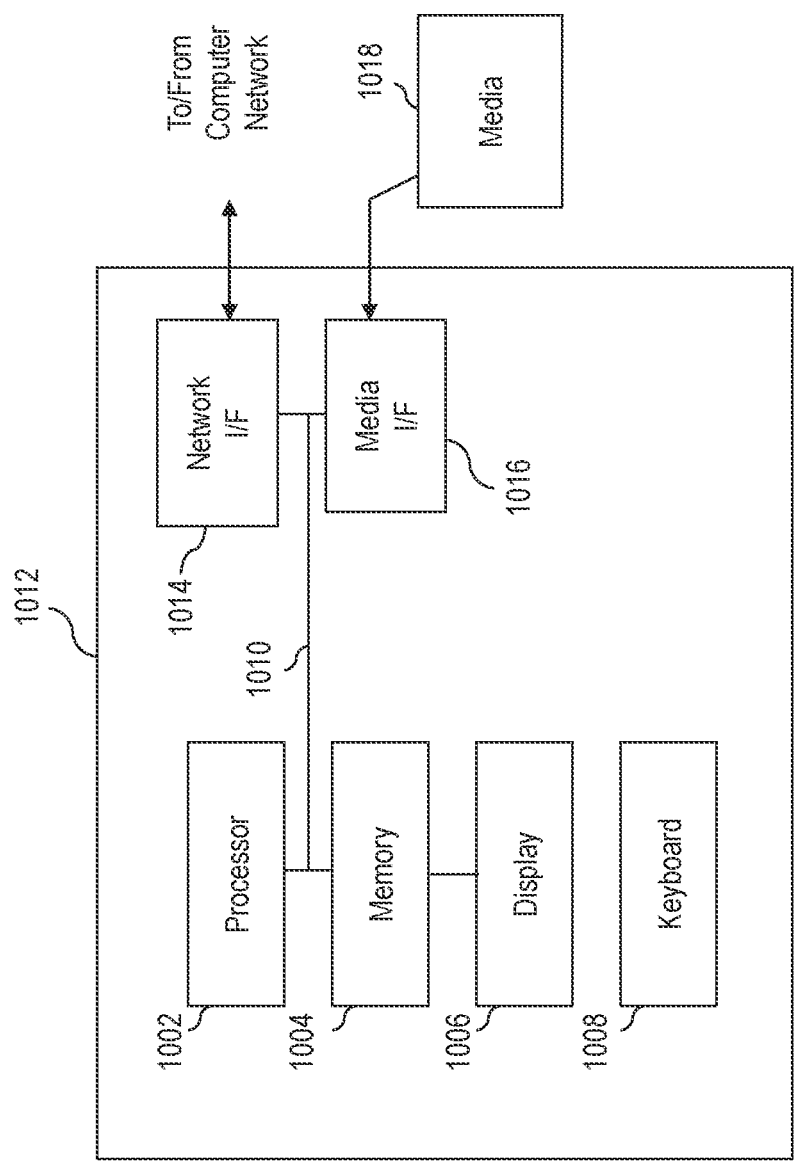
FIG. 10 is a system diagram of an exemplary computer system on which at least one embodiment of the present disclosure can be implemented.

Additionally, an embodiment of the present disclosure can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
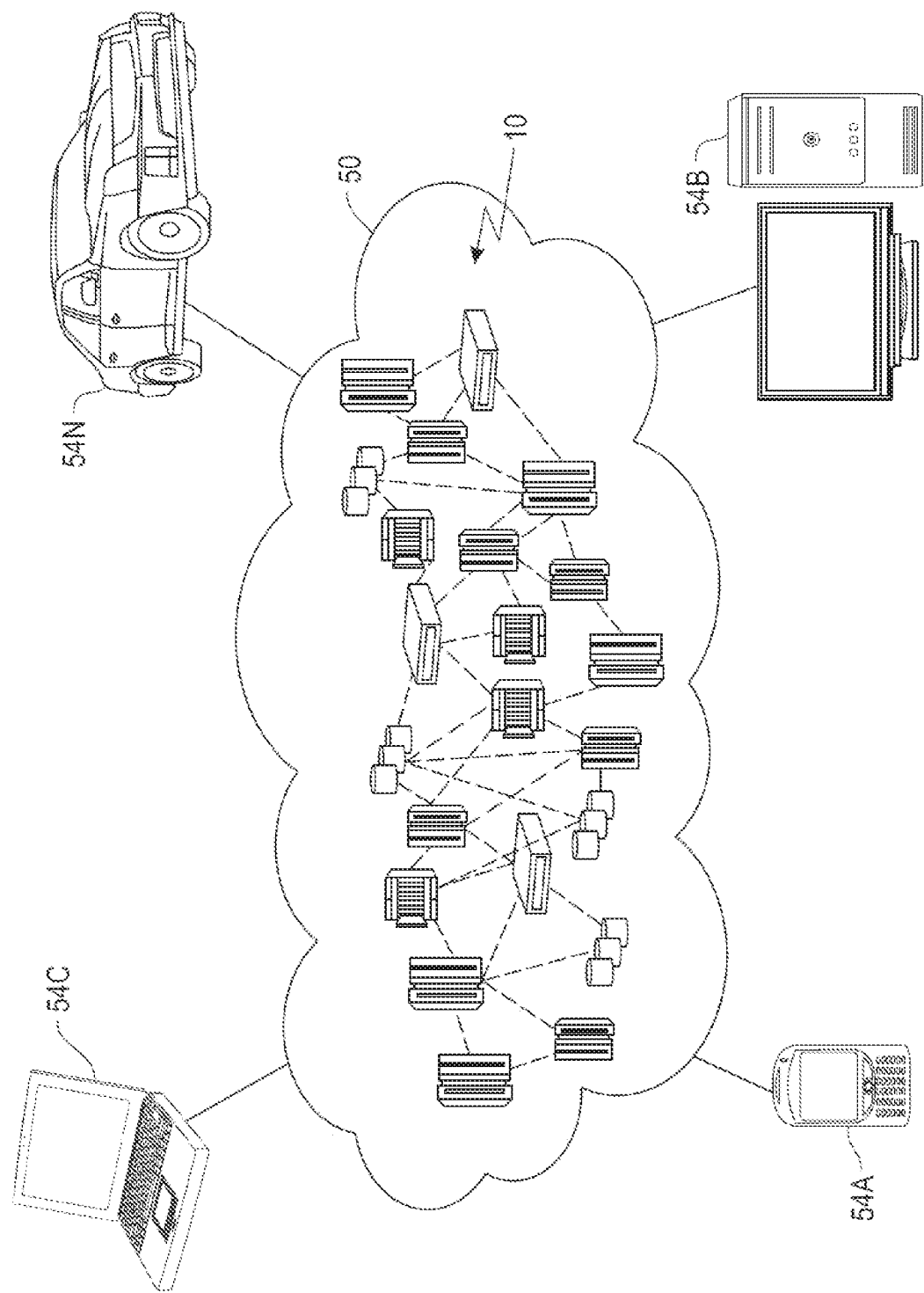
FIG. 11 depicts a cloud computing environment in accordance with exemplary embodiments.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
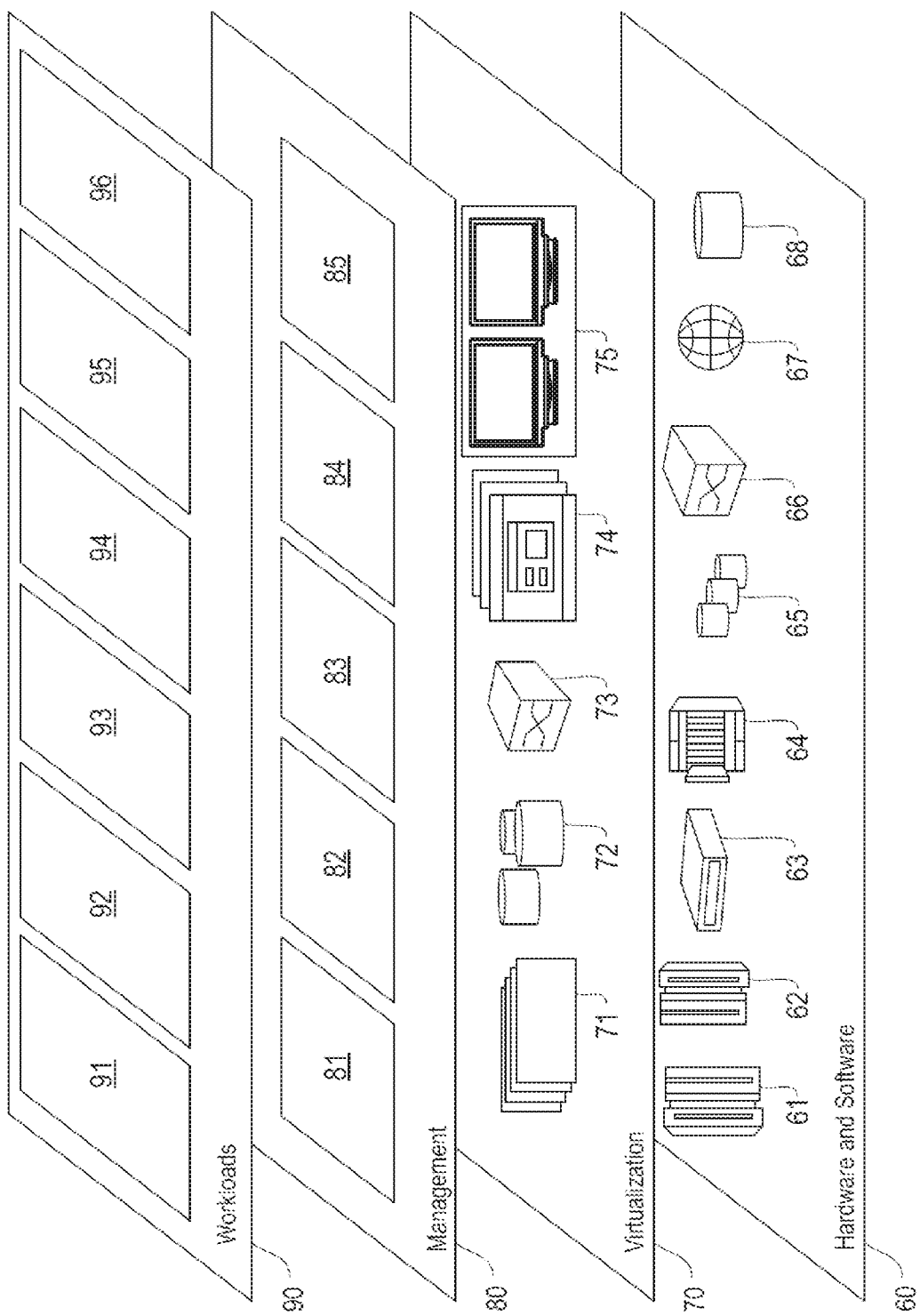
FIG. 12 depicts abstraction model layers in accordance with exemplary embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and path-coverage directed black box API testing 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, automatically generating realistic production payload data in a privacy-preserving way, and automatically generate test cases to test system behavior for black-box API access.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   determining one or more constraints based on one or more inputs and one or more corresponding outputs of an application programming interface in a production environment;
   generating one or more initial test inputs based at least in part on the one or more constraints;
   creating a program dependency graph based on trace sequences and request-response data obtained in response to providing the one or more initial test inputs to at least one endpoint of the application programming interface;
   enhancing the program dependency graph by generating one or more additional test inputs directed to at least one of a plurality of paths of the dependency graph;
   identifying, based on the enhanced program dependency graph, at least a portion of the application programming interface that is not covered by an existing test suite; and using the enhanced program dependency graph to generate one or more new test cases for the test suite based on the identifying;
wherein the method is carried out by at least one computing device.

2. The computer-implemented method of claim 1, wherein the one or more initial test inputs and the one or more additional test input satisfy a specification of the application programming interface.

3. The computer-implemented method of claim 2, wherein the specification of the application programming interface is provided in a standardized, machine-readable format.

4. The computer-implemented method of claim 2, comprising:
assigning a first label to at least a first subset of the plurality of paths in the program dependency graph in response to determining that the request-response data corresponding to the path satisfies the specification of the application; and
assigning a second label to a second subset of the plurality of paths in the program dependency graph in response to determining that the request-response data corresponding to the path fails to satisfy the specification of the application.

5. The computer-implemented method of claim 4, wherein the one or more additional test inputs are generated to at least one of:
determine boundaries of at least one of the paths in the first subset; and
identify additional paths between paths in the first subset and paths in the second sub set.

6. The computer-implemented method of claim 1, wherein at least one of the initial test inputs resulted in a failure of the application programming interface, and wherein generating the one or more additional test inputs comprises perturbing the at least one of the initial test inputs to identify conditions that cause the failure.

7. The computer-implemented method of claim 1, wherein the program dependency graph represents at least one of: one or more data dependencies and one or more control dependencies corresponding to the application programming interface.

8. The computer-implemented method of claim 1, wherein creating the program dependency graph comprises:
modeling the trace sequences and request-response data using at least one regression learning technique; and
generating at least one decision tree for each of the trace sequences based on said modeling.

9. The computer-implemented method of claim 1, wherein the one or more initial test inputs comprise at least one of: one or more synthetic inputs and one or more random inputs.

10. The computer-implemented method of claim 1, wherein the identifying comprises:
mapping test cases in the existing test to the plurality of paths of the program dependency graph.

11. The computer-implemented method of claim 1, wherein software is provided as a service in a cloud environment.

12. A computer program product comprising a computer readable storage medium having program instructions embodied therewith, the program instructions executable by a computing device to cause the computing device to:

determine one or more constraints based on one or more inputs and one or more corresponding outputs of an application programming interface in a production environment;
generate one or more initial test inputs based at least in part on the one or more constraints;
create a program dependency graph based on trace sequences and request-response data obtained in response to providing the one or more initial test inputs to at least one endpoint of the application programming interface;
enhance the program dependency graph by generating one or more additional test inputs directed to at least one of a plurality of paths of the dependency graph;
identify, based on the enhanced program dependency graph, at least a portion of the application programming interface that is not covered by an existing test suite; and
use the enhanced program dependency graph to generate one or more new test cases for the test suite based on the identifying.

13. The computer program product of claim 12, wherein the one or more initial test inputs and the one or more additional test input satisfy a specification of the application programming interface.

14. The computer program product of claim 13, wherein the computing device is caused to:
assign a first label to at least a first subset of the plurality of paths in the program dependency graph in response to determining that the request-response data corresponding to the path satisfies the specification of the application; and
assign a second label to a second subset of the plurality of paths in the program dependency graph in response to determining that the request-response data corresponding to the path fails to satisfy the specification of the application.

15. The computer program product of claim 14, wherein the one or more additional test inputs are generated to at least one of:
determine boundaries of at least one of the paths in the first subset; and
identify additional paths between paths in the first subset and paths in the second sub set.

16. The computer program product of claim 12, wherein at least one of the initial test inputs resulted in a failure of the application programming interface, and wherein generating the one or more additional test inputs comprises perturbing the at least one of the initial test inputs to identify conditions that cause the failure.

17. The computer program product of claim 12, wherein the program dependency graph represents at least one of: one or more data dependencies and one or more control dependencies corresponding to the application programming interface.

18. The computer program product of claim 12, wherein creating the program dependency graph comprises:
modeling the trace sequences and request-response data using at least one regression learning technique; and
generating at least one decision tree for each of the trace sequences based on said modeling.

19. The computer program product of claim 12, wherein the one or more initial test inputs comprise at least one of: one or more synthetic inputs and one or more random inputs.

20. A system comprising:
a memory configured to store program instructions;

a processor operatively coupled to the memory to execute the program instructions to:

determine one or more constraints based on one or more inputs and one or more corresponding outputs of an application programming interface in a production environment;

generate one or more initial test inputs based at least in part on the one or more constraints;

create a program dependency graph based on trace sequences and request-response data obtained in response to providing the one or more initial test inputs to at least one endpoint of the application programming interface;

enhance the program dependency graph by generating one or more additional test inputs directed to at least one of a plurality of paths of the dependency graph;

identify, based on the enhanced program dependency graph, at least a portion of the application programming interface that is not covered by an existing test suite; and use the enhanced program dependency graph to generate one or more new test cases for the test suite based on the identifying.

\* \* \* \* \*